(12) United States Patent
Wimmer et al.

(10) Patent No.: US 7,410,036 B2
(45) Date of Patent: Aug. 12, 2008

(54) INTERMEDIATE ELEMENTS FOR A BRAKE-DISC/HUB ASSEMBLY AND A BRAKE-DISC/HUB ASSEMBLY

(75) Inventors: Josef Wimmer, Vilshofen (DE); Josef Schropp, Eichendorf (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/519,026

(22) Filed: Sep. 12, 2006

(65) Prior Publication Data

US 2007/0084685 A1 Apr. 19, 2007

Related U.S. Application Data

(63) Continuation of application No. PCT/EP2005/002183, filed on Mar. 2, 2005.

(30) Foreign Application Priority Data

Mar. 12, 2004 (DE) .................. 10 2004 012 103

(51) Int. Cl.
*F16D 65/12* (2006.01)
*B60T 1/06* (2006.01)
(52) U.S. Cl. .................... 188/218 XL; 188/18 A; 256/158
(58) Field of Classification Search ........... 188/218 XL, 188/18 A; 267/158
See application file for complete search history.

(56) References Cited

U.S. PATENT DOCUMENTS 3,730,304 A * 5/1973 Buyze .................. 188/218 XL

| 5,700,119 | A | 12/1997 | Wakai |
| 6,467,588 | B1 * | 10/2002 | Baumgartner et al. . 188/218 XL |
| 6,564,913 | B2 * | 5/2003 | Baumgartner et al. . 188/218 XL |
| 6,722,479 | B2 * | 4/2004 | Baumgartner et al. . 188/218 XL |
| 6,910,556 | B1 | 6/2005 | Baumgartner et al. |

FOREIGN PATENT DOCUMENTS

DE 199 18 069 A1 11/2000

OTHER PUBLICATIONS

International Search Report dated Jun. 6, 2005.

* cited by examiner

*Primary Examiner*—Robert A. Siconolfi
*Assistant Examiner*—Mahbubur Rashid
(74) *Attorney, Agent, or Firm*—Crowell & Moring LLP

(57) ABSTRACT

A brake-disc/hub assembly is provided with a disc/hub connection for connecting a brake disc to a brake disc hub. The brake disc includes support elements on the inner circumference thereof, the brake disc hub is provided on the outer circumference thereof with cams, and intermediate elements are radially distributed in the circumferential direction between the brake disc hub and the brake disc, extending into cavities running in the circumferential direction between the cams and the support elements, and hence, providing a transfer of the braking force from the brake disc to the brake disc hub. Each intermediate element includes two shoulders running at least completely or essentially in parallel to each other, whereby one shoulder contacts a corresponding cam and the other shoulder contacts a corresponding support element, embodied such that the total thickness of opposing shoulders on the elements may be reduced for disassembly thereof.

26 Claims, 5 Drawing Sheets

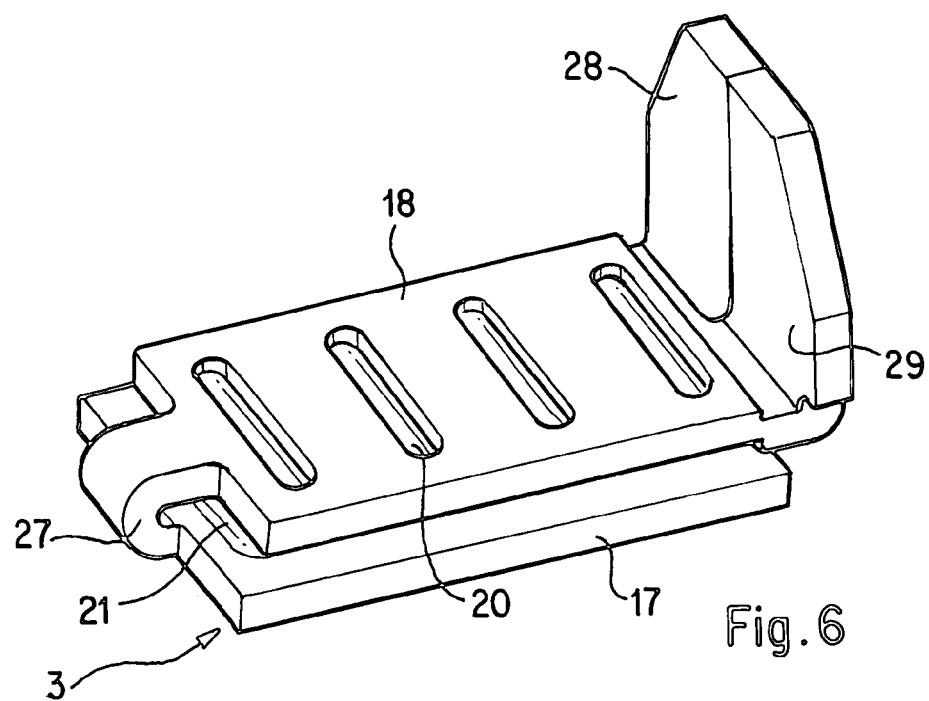
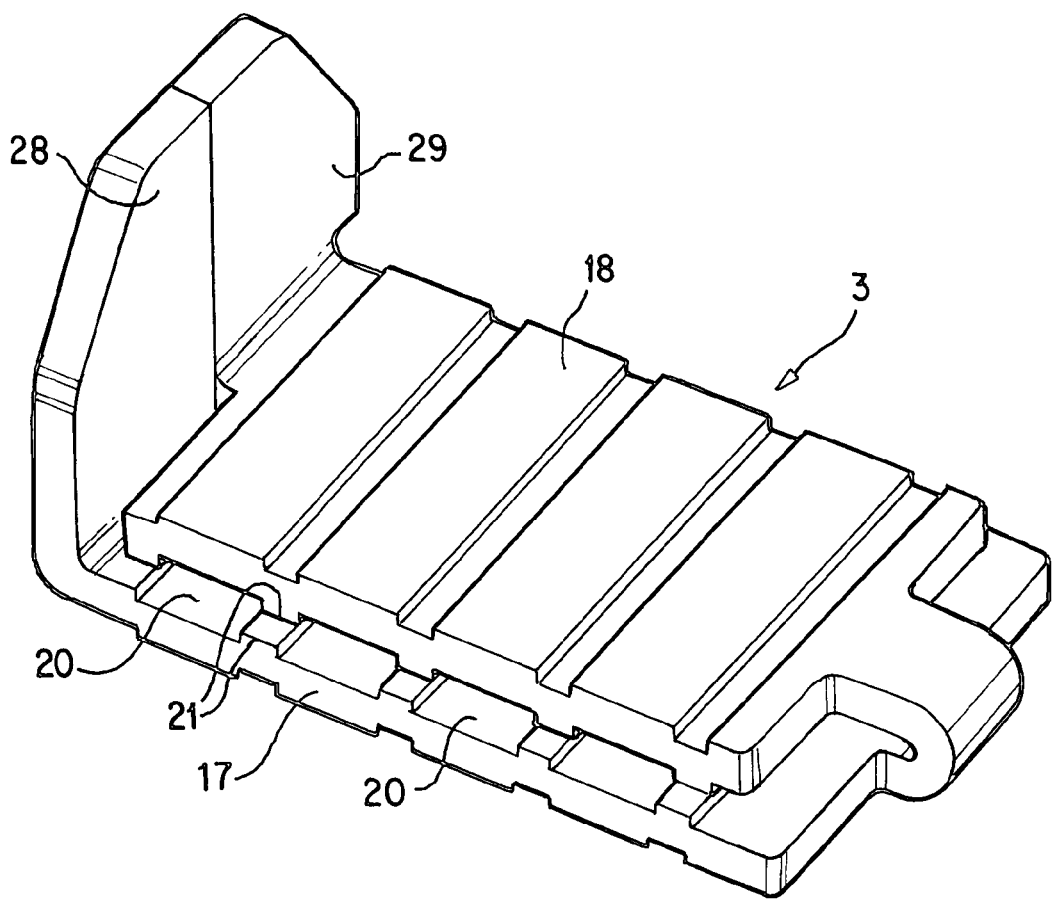
Fig. 6
Fig. 7

INTERMEDIATE ELEMENTS FOR A BRAKE-DISC/HUB ASSEMBLY AND A BRAKE-DISC/HUB ASSEMBLY

CROSS-REFERENCE TO RELATED APPLICATIONS

This application is a continuation of PCT International Application No. PCT/EP2005/002183, filed on Mar. 2, 2005, which claims priority under 35 U.S.C. §119 to German Application No. 10 2004 012 103.6, filed Mar. 12, 2004, the entire disclosures of which are expressly incorporated by reference herein.

BACKGROUND AND SUMMARY OF THE INVENTION

The present invention relates to a brake-disc/hub combination, and to an intermediate element of a brake-disc/hub combination.

A brake-disc/hub assembly having a brake disc, which is ventilated at an interior thereof is known from German patent document DE 199 18 069 A1 (having U.S. counterpart U.S. Pat. No. 6,910,556). That document describes a connection of the brake disc to a brake disc hub by use of intermediate elements, which transmit the braking torque from the brake disc to the brake disc hub. The intermediate elements bear against an associated support element of the brake disc with one limb, and against a cam of the brake disc hub with the other limb.

The intermediate elements known from the prior art have two smooth-faced limbs which run parallel to one another and bear against one another in a functional position. The limbs are formed by folding a sheet metal strip.

This known construction has been proven in principle, though disassembly of the intermediate elements can be somewhat difficult under some circumstances since, for example, corrosion of the support elements of the brake disc and/or corrosion of the cams of the brake disc hub results in a relatively high expenditure of force being required for pressing the intermediate elements out, specifically over the entire pressing-out path.

Shrinking of the brake disc can also lead to distortion of the intermediate elements, resulting in it only being possible to release the intermediate elements from the undefined press fit with corresponding expenditure.

The present invention is, therefore, based on the object of further developing the intermediate elements of a brake-disc/hub combination using simple measures such that the intermediate elements may be easily disassembled even under difficult conditions.

This, and other, objects are achieved by providing a brake-disc/hub assembly, and an intermediate element therefore, having support elements at the inner periphery of the brake disc, cams at the outer circumference of the brake disc hub, and intermediate elements distributed in the peripheral direction radially between the brake disc hub and the brake disc, the intermediate elements protruding into intermediate spaces which extend in the peripheral direction between the cams and the support elements and, therefore, ensuring transmission of braking torque from the brake disc to the brake disc hub, wherein each intermediate element has two limbs which run at least entirely or substantially parallel to one another, an associated cam bearing against one limb and an associated support element bearing against the other limb, and further wherein an overall thickness of the limbs, which bear against one another, of the intermediate elements are reduced in order to disassemble them.

As a result of the possibility of reducing the overall thickness of the intermediate element limbs, which bear against one another, in order to disassemble them, the press fit of the assembled intermediate elements required for optimum transmission of braking torque is eliminated, so that the intermediate elements may be disassembled without hindrance. This also, practically, prevents the intermediate elements from being fused onto the support elements and/or the cams, which bear against them, as a result of corrosion, so that the disassembly problems as described with regard to the prior art no longer occur.

Here, the advantages which result from this are particularly notable in particular with regard to cost minimization, since consumable parts of the disc brake can be exchanged without hindrance and in the shortest possible time.

In addition to the simplified disassembly of the intermediate elements, the cost-effective production of the latter also contributes to cost minimization, since the intermediate parts are simple to manufacture as punched parts. This is of particular significance in particular as a result of the large quantities in which the intermediate elements are used.

According to one advantageous development of the invention, it is provided that the overall reduction in thickness of the limbs which bear against one another is provided by using projections and recesses which, in a functional position of the intermediate element, do not engage with one another, but in order to release the intermediate element, can be displaced relative to one another such that they overlap, with the outline dimensions of the projections being at least slightly smaller than the associated recesses. As a result, after the limbs are displaced in an axially parallel fashion, the projections dip into the recesses, the projections acting as spacers when not in engagement.

The spaced-apart position of the limbs relative to one another corresponds to the installation position, in which the intermediate elements respectively bear, under load, against the cams of the brake disc hub and against the support elements of the brake disc.

A short movement of one limb relative to the other is sufficient to release the loading in order to remove the intermediate elements, as a result of which relative movement the loading is dissipated and the intermediate element may be easily removed.

The recesses and projections may be produced in a very simple manner, for example by punching in beads which, at one side, form the projections, and at the other side, form the recesses.

It is contemplated to form the intermediate elements in one or two parts, it being possible in any case for the recesses to be continuous, that is to say to be provided as passage openings.

The shape of the recesses and projections which interact with one another can, in principle, be selected arbitrarily. In the functional position of the intermediate elements, however, the recesses and projections are arranged one behind the other in the displacement direction of one limb relative to the other, and the recesses and projections approximately correspond to one another in terms of their peripheral contour.

Advantageous developments of the invention are further described and claimed herein.

Other objects, advantages and novel features of the present invention will become apparent from the following detailed description of the invention when considered in conjunction with the accompanying drawings.

BRIEF DESCRIPTIONS OF THE DRAWINGS

FIGS. 4-8 each show a further exemplary embodiment of an intermediate element in a perspective illustration.

DETAILED DESCRIPTION OF THE DRAWINGS

Figure 1:
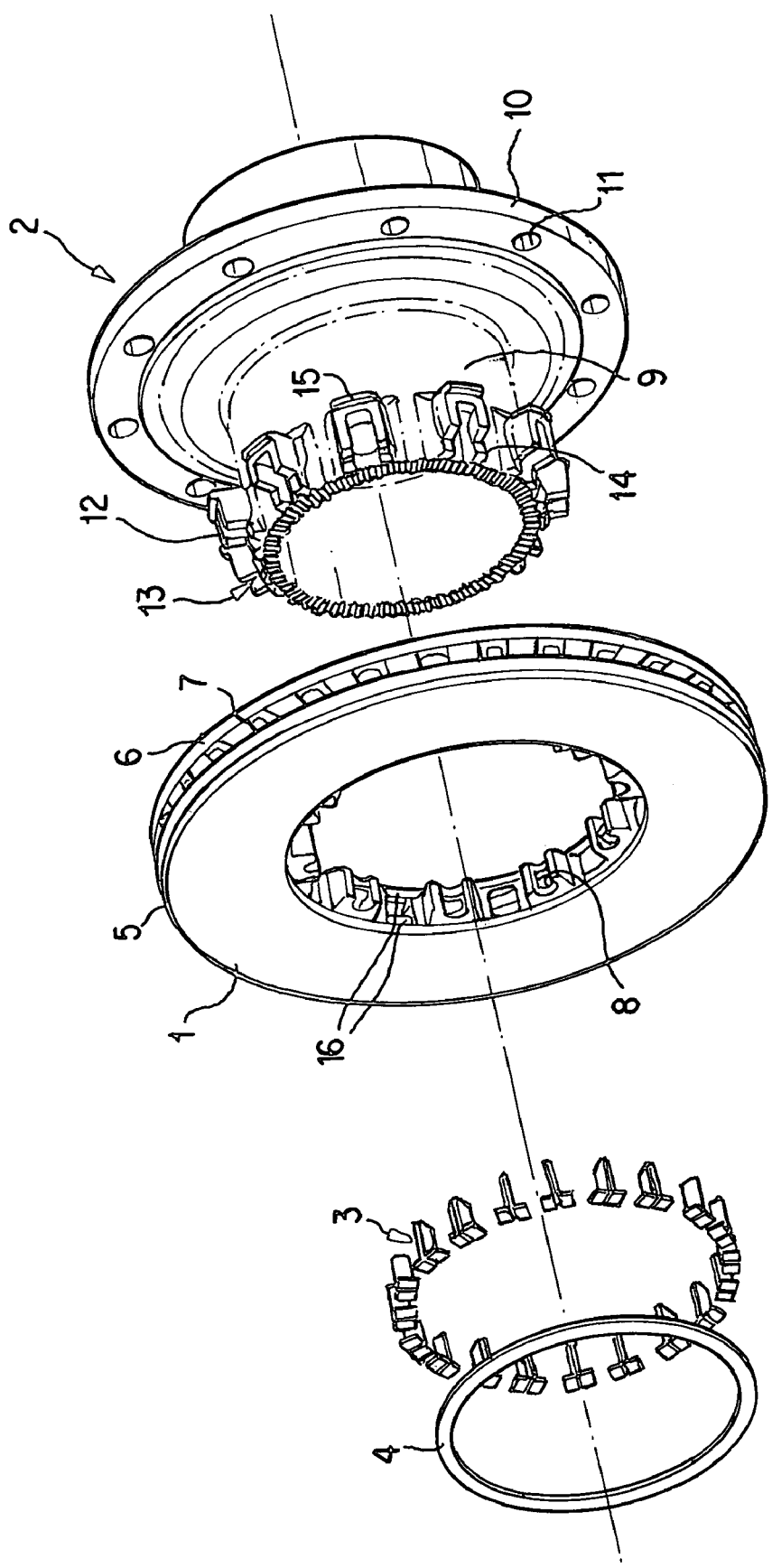
FIG. 1 shows a brake-disc/hub combination according to the invention in an exploded illustration.

FIG. 1 illustrates a brake-disc/hub combination which has a brake disc 1 and a brake disc hub 2, which can also simultaneously be formed as a wheel hub or can be pushed onto a separate hollow cylindrical wheel hub. The brake disc 1, which is ventilated at the inside, has two friction rings 5, 6 which are connected to one another by way of webs 7.

In order to transmit torque, radially inwardly extending support elements 8 are integrally formed on the inner periphery of the brake disc 1. The support elements 8 are arranged spaced apart from one another and are distributed uniformly over the periphery.

The wheel hub 2 has a hollow cylindrical pot-shaped section 9, which is adjoined at one end by a disc 10 which is provided with bores 11. That end 13 of the section 9 which is remote from the disc 10 has radially outwardly protruding cams 12, which are distributed over the outer periphery.

The brake disc 1 can be pushed axially onto the brake disc hub 2, the cams 12 and the support elements 8 engaging in one another in the peripheral direction. Here, intermediate spaces are formed between the cams 12 and the support elements 8, the intermediate elements 3 being inserted into the intermediate spaces. The braking torque, which acts during a braking operation, is transmitted from the support element 8 of the brake disc 1 via the intermediate elements 3 to the cams 12 of the brake disc hub 2.

The brake disc 1 is axially secured on the brake disc hub 2 or section 9 at the side which faces toward the disc 10 by way of radially outwardly directed shoulders 15, which are integrally formed on the cams, with inwardly directed stops 16 of the brake disc 1 bearing against the shoulders 15. Here, for securing the brake disc 1 in the other direction, a securing ring 4 is provided, which is situated in an annular groove 14 arranged peripherally in the cams 12. The securing ring 4 also prevents the inserted intermediate elements 3 from being displaced axially.

FIGS. 2 and 4 to 7 illustrate different embodiments of intermediate elements 3, which each have two limbs 17, 18 bearing against one another and running parallel to one another.

Figure 2:
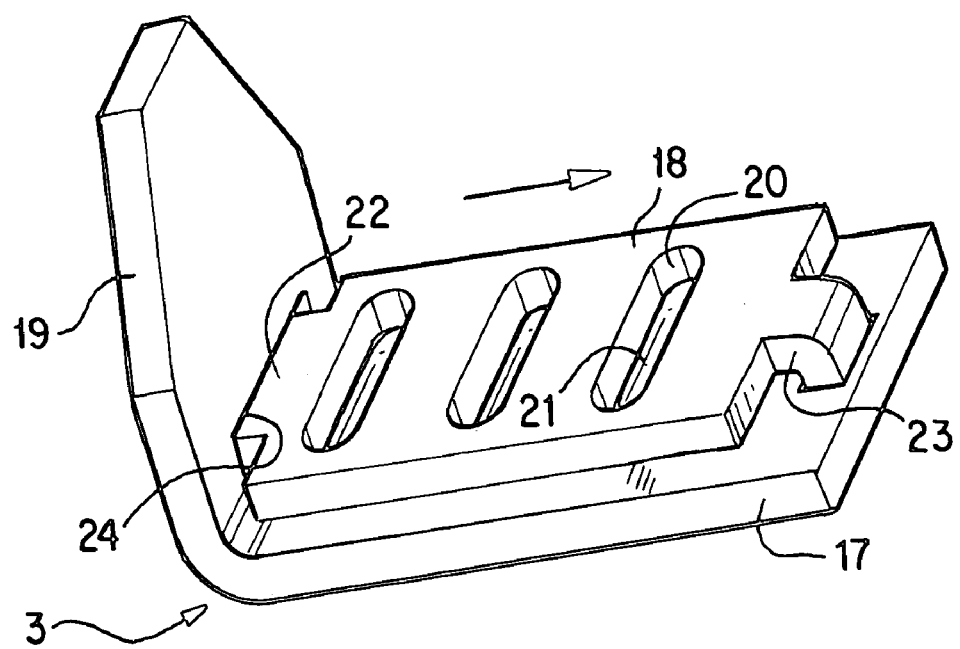
FIG. 2 shows an example of an intermediate element in a perspective view.
Figure 3:
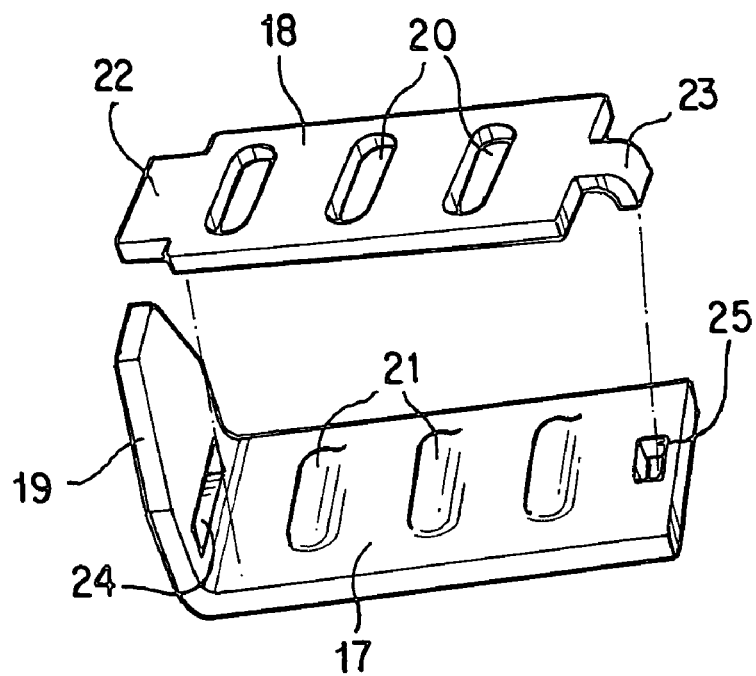
FIG. 3 shows the intermediate element according to FIG. 2 as an exploded diagram.

The exemplary embodiment of an intermediate element 3 shown in FIGS. 2 and 3 is formed in two parts, that is to say the two limbs 17, 18 are not materially connected to one another. This can be very clearly seen in FIG. 3 in particular. It can also be seen here that the limb 18 has a plurality of recesses 20 in the form of slot-shaped passage openings, while the limb 17 is provided with projections 21 which are formed so as to be raised in the direction of the limb 18.

In the in use position, that is to say when the intermediate element 3 is inserted into the intermediate space formed between the associated cam 12 and the support element 8, the lower side of the limb 18 bears against the projections 21 outside the recesses 20. By displacing the limb 18 relative to the limb 17 in the direction denoted by the arrow in FIG. 2, the recesses 20 overlap with the projections 21 in such a way that the projections 21 engage in the recesses 20, so that the projections 21 no longer form a support surface, but rather the two base faces of the limbs 17, 18 bear directly against one another.

As can be seen, the overall thickness of the limbs 17, 18 decreases due to the dipping depth of the projections 21 into the recesses 20, so that the intermediate space, in which the intermediate element 3 is inserted when assembled, is then wider than the overall thickness of the two limbs 17, 18. The intermediate element 3 which has been changed dimensionally to such an extent can therefore be easily removed.

To facilitate assembly, the limb 18 has, at one end, a nose 23, which is directed toward the limb 17 and engages in a nose opening 25 of the limb 17. A degree of play is provided in the displacement direction of the limb 18 such that the limb 18 can be easily displaced relative to the limb 17.

An insertion opening 24 is provided in an angle part 19 which adjoins the limb 17, with a tongue 22 of the limb 18 engaging in the insertion opening 24. Using a suitable tool, it is possible to exert a displacement pressure on the limb 22 so that the limb 18 can be displaced in the direction of the arrow out of a use position into a non-use position. The elongate shapes of both the recesses 20 and the projections 21 also run transversely with respect to the displacement direction.

Figure 4:
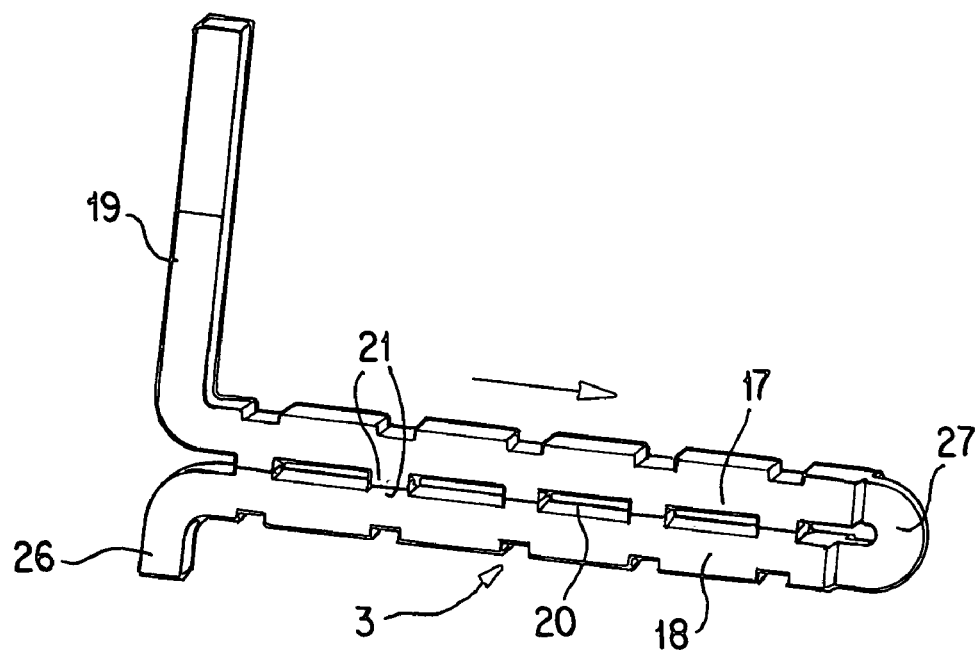

In FIG. 4, the intermediate element 3 is illustrated as a single-part component, in which the two parallel limbs 17, 18 are materially connected to one another and are folded over one another by way of a connecting piece 27. The intermediate element 3 may be produced and the limbs 17, 18 may be deformed by way of a fold or the like of a sheet metal strip.

The connecting piece 27 preferably has a smaller width than the two limbs 17, 18 so that the limbs can be displaced on one another more easily.

Here, both limbs 17, 18 have projections 21 which bear directly against one another in the illustrated use position. Adjacent to the projections 21 are the recesses 20, which are formed practically by the formation of the projections 21 and are preferably stamped in the shape of beads.

A displacement of the limbs 17, 18 relative to one another for disassembling the intermediate element 3 is provided, with deformation of the connecting piece 27, by the action of force on the angle part 19 of the limb 17 or on an oppositely directed angle part 26 of the limb 18, so that the projections 21 move out of their common overlap region until they reach a region of overlap in each case with a recess 20 and dip into the latter, resulting in the overall thickness of the two limbs 17, 18, which bear against one another, being reduced.

Figure 5:
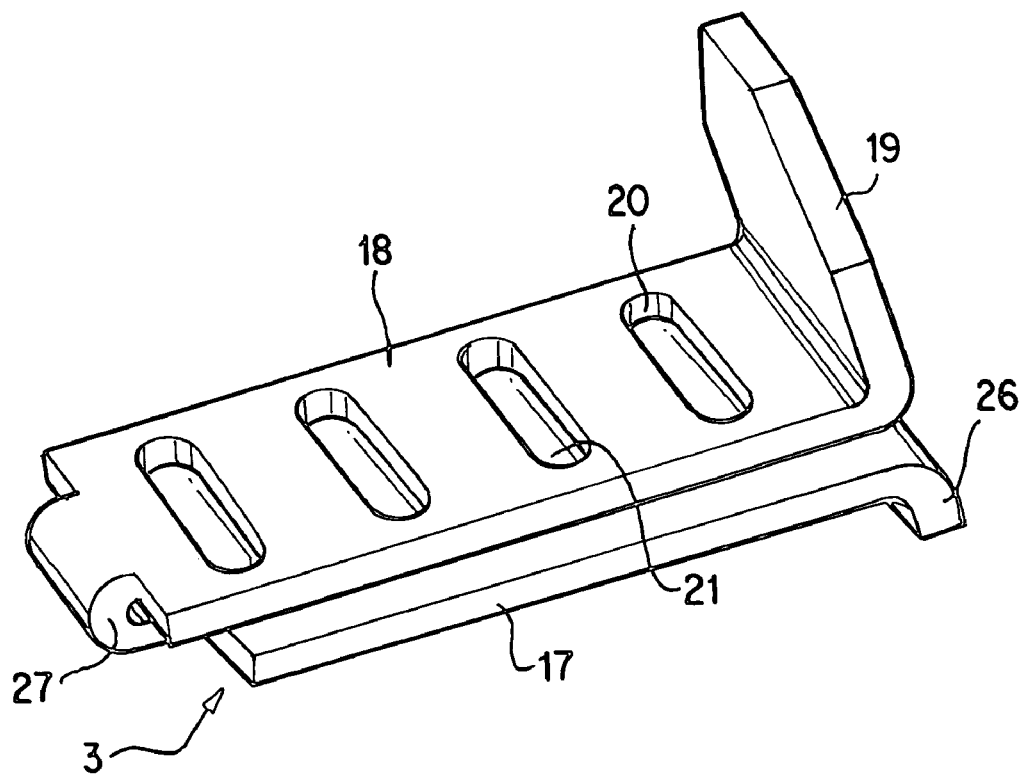

This is likewise the case in the exemplary embodiment of an intermediate element corresponding to FIG. 5 which, with regard to the arrangement and shaping of the recesses 20 and projections 21, corresponds to that of FIGS. 2 and 3, while the two limbs 17, 18 are likewise integrally connected to one another by way of a deformable connecting piece 27.

The further exemplary embodiments of an intermediate element 3 shown in FIGS. 6 and 7 are likewise embodied as single-part components, like those illustrated in FIGS. 4 and 5, with the configuration of the limbs 17, 18 of the intermediate element 3 according to FIG. 6 corresponding to that of FIG. 5, and the configuration of the limbs 17, 18 of the intermediate element 3 according to FIG. 7 corresponding to that of FIG. 4.

In both cases, the limbs 17, 18 are adjoined, at the side remote from the connecting piece 27, by angle parts 28, 29 which run in the same direction and parallel to one another, the width of each angle part 28, 29 approximately corresponding to the width of the adjacent angle part and the combined width of both angle parts approximately corresponding to the overall width of the intermediate element.

Figure 8:
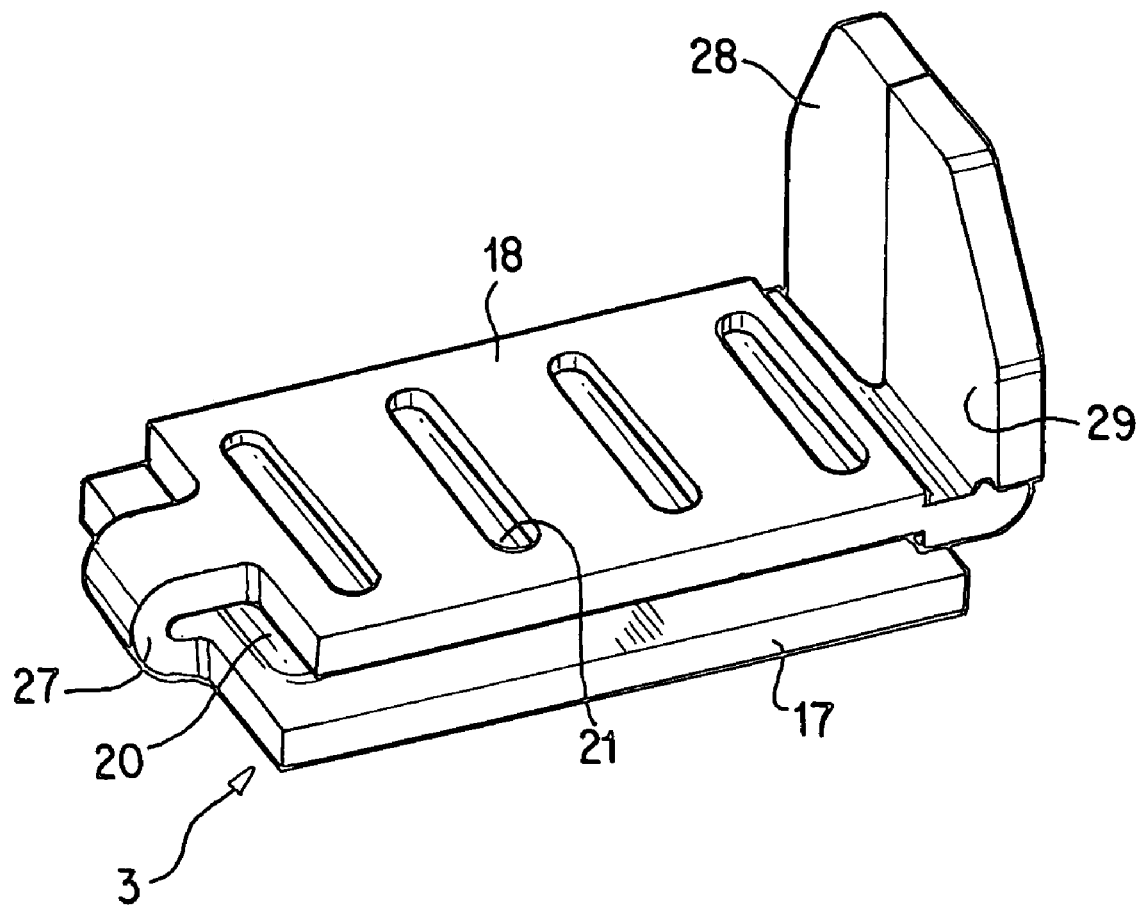

FIG. 8 shows an intermediate element which corresponds in terms of its basic design to that of FIG. 6, that is to say the limbs 17, 18 are adjoined by angle parts 28, 29 which run in the same direction and parallel to one another. In contrast to the exemplary embodiment according to FIG. 6, the recesses 20 are provided in the lower limb 17 relative to the direction of extent of the angle parts 28, 29, while the projections 21 are introduced into the upper limb 18 by way of forming and protrude toward the lower limb 17. Only those beads which are generated during forming of the projections 21 can be seen in FIG. 8.

TABLE OF REFERENCES SYMBOLS

1 Brake disc
2 Brake disc hub
3 Intermediate element
4 Securing ring
5 Friction ring
6 Friction ring
7 Web
8 Support element
9 Section
10 Disc
11 Bore
12 Cam
13 End
14 Annular groove
15 Shoulder
16 Stop
17 Limb
18 Limb
19 Angle part
20 Recess
21 Projection
22 Tongue
23 Nose
24 Insertion opening
25 Nose opening
26 Angle part
27 Connecting piece
28 Angle part
29 Angle part The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake-disc/hub assembly, comprising:
a brake disc having support elements at an inner periphery thereof;
a hub having cams at an outer circumference thereof;
intermediate elements distributed in a peripheral direction radially between the hub and the brake disc, the intermediate elements protruding into intermediate spaces arranged about the peripheral direction between the cams and the support elements to ensure transmission of braking torque from the brake disc to the hub;
wherein each intermediate element has two limbs running substantially parallel to one another, an associated cam bearing against one of the two limbs and an associated support element bearing against the other of the two limbs, the two limbs defining an outer thickness of the intermediate element in a direction between the associated cam and support element; and
means for reducing the outer thickness of the intermediate element for disassembling the disc from the hub.

2. The brake-disc/hub assembly as claimed in claim 1, wherein the reducing means comprise projections and recesses, respectively, on the limbs, which projections of one limb engage in recesses of another limb in order to reduce the outer thickness.

3. The brake-disc/hub assembly as claimed in claim 2, wherein the limbs are displaceable relative to one another in an axially parallel fashion to allow the projections and recesses to engage one another.

4. The brake-disc/hub assembly as claimed in claim 2, wherein, in a use position of the intermediate element, the projections of one limb bear against a base face of the other limb in areas outside of the recesses.

5. The brake-disc/hub assembly as claimed in claim 2, wherein the recesses and projections are formed as beads.

6. The brake-disc/hub assembly as claimed in claim 2, wherein outline dimensions of each recess are at least slightly larger than outline dimensions of the associated projection.

7. The brake-disc/hub assembly as claimed in claim 2, wherein the recesses are formed in a slot shape and the projections have a matching contour.

8. The brake-disc/hub assembly as claimed in claim 1, wherein the limbs are displaceable relative to one another in an axially parallel fashion.

9. The brake-disc/hub assembly as claimed in claim 8, wherein, in a use position of the intermediate element, the projections of one limb bear against a base face of the other limb in areas outside of the recesses.

10. The brake-disc/hub assembly as claimed in claim 8, wherein a longitudinal extent of the recesses and projections runs transversely with respect to a relative displacement direction of the limbs.

11. The brake-disc/hub assembly as claimed in claim 1, wherein the limbs are formed as separate parts.

12. The brake-disc/hub assembly as claimed in claim 11, whereon one limb has a nose, which engages in a nose opening of the other limb.

13. The brake-disc/hub assembly as claimed in claim 12, wherein the nose opening is wider than the nose to an extent corresponding to a displacement path of the limb relative to the limb.

14. The brake-disc/hub assembly as claimed in claim 12, wherein a limb of the two-part intermediate element has a tongue on a side which is remote from the nose, said tongue being situated in an insertion opening of the limb and/or of an angle part which is integrally formed thereon.

15. The brake-disc/hub assembly as claimed in claim 1, wherein the limbs are integrally connected to one another by a connecting fold piece.

16. The brake-disc/hub assembly as claimed in claim 1, wherein in an in use position, two opposite projections of the two limbs bear against one another.

17. The brake-disc/hub assembly as claimed in claim 16, wherein the projections which bear against one another delimit adjacent recesses.

18. The brake-disc/hub assembly as claimed in claim 1, wherein each limb has, at ends which are adjacent to one another, an angle part.

19. The brake-disc/hub assembly as claimed in claim 18, wherein the angle part extends at a right angle to the associated limb.

20. The brake-disc/hub assembly as claimed in claim 18, wherein the angle parts run in opposite directions.

21. The brake-disc/hub assembly as claimed in claim 18, wherein the angle parts run in the same direction.

22. The brake-disc/hub assembly as claimed in claim 21, wherein a width of each angle part corresponds to approximately half of a width of the associated limb.

23. The brake-disc/hub assembly as claimed in claim 21, wherein for the angle parts which run in the same direction, the projections are provided in an upper limb relative to the angle parts, and the recesses are provided in a lower limb relative to the angle parts.

24. A component for use in a brake-disc/hub assembly for transmitting braking torque from an inner peripherally formed support element of a brake disc to an outer peripherally formed cam of a hub, the component comprising:

an intermediate element configured to be insertable into an intermediate space formed between the cam and the support element;

the intermediate element having first and second limbs arranged substantially parallel to one another, wherein an outer surface of the first limb is configured to bear against an associated cain when in use and an outer surface of the second limb is configured to bear against an associated support element when in use, the two limbs defining an outer thickness of the intermediate element in a direction between the associated cam and support element; and wherein one of the first and second limbs is provided with at least one projection and another of the first and second limbs is provided with at least one recess, the at least one projection engaging in the at least one recess in a non-use position of the intermediate element in order to reduce the outer thickness of the intermediate element.

25. A component for use in a brake-disc/hub assembly for transmitting braking torque from an inner peripherally formed support element of a brake disc to an outer peripherally formed cam of a hub, the component comprising:

an intermediate element configured to be insertable into an intermediate space formed between the cam and the support element;

the intermediate element having first and second limbs arranged substantially parallel to one another, wherein an outer surface of the first limb is configured to bear against an associated cam when in use and an outer surface of the second limb is configured to bear against an associated support element when in use, the two limbs defining an outer thickness of the intermediate element in a direction between the associated cam and support element; and means for reducing the outer thickness of the intermediate element to facilitate disassembly of the intermediate element from the brake-disc/hub assembly.

26. A method of disassembling a brake-disc/hub assembly composed of a brake disc having support elements on an inner periphery thereof, a hub having cams on an outer periphery thereof, and intermediate elements protruding into intermediate spaces arranged about a peripheral direction between the cams and the support elements to ensure braking torque transmission from the brake disc to the hub, the method comprising the acts of: reducing a thickness of each of the intermediate elements in the peripheral direction; and displacing the intermediate elements with the reduced thicknesses out of the intermediate spaces, wherein the act of reducing the thickness of each of the intermediate elements further comprises the acts of: for an intermediate element comprising two limbs extending substantially parallel to one another in the intermediate space, displacing projections formed on one of the two limbs into recesses formed on the other of the two limbs to reduce the overall thickness of the intermediate element prior to displacing the intermediate element from the intermediate space.

* * * * *